United States Patent
Lukach, Jr.

(10) Patent No.: US 9,091,599 B2
(45) Date of Patent: Jul. 28, 2015

(54) PTFE JACKETED TANTALUM TIPPED THERMOWELL

(71) Applicant: MICROMOLD PRODUCTS INC., Yonkers, NY (US)

(72) Inventor: Arthur S. Lukach, Jr., East Hampton, NY (US)

(73) Assignee: MICROMOLD PRODUCTS INC., Yonkers, NY (US)

( * ) Notice: Subject to any disclaimer, the term of this patent is extended or adjusted under 35 U.S.C. 154(b) by 79 days.

(21) Appl. No.: 13/652,315

(22) Filed: Oct. 15, 2012

(65) Prior Publication Data

US 2013/0107908 A1 May 2, 2013

Related U.S. Application Data

(60) Provisional application No. 61/546,796, filed on Oct. 13, 2011.

(51) Int. Cl.
| | |
|---|---|
| *G01K 1/08* | (2006.01) |
| *G01K 1/14* | (2006.01) |
| *G01K 7/02* | (2006.01) |
| *G01K 1/16* | (2006.01) |

(52) U.S. Cl.
CPC ... *G01K 1/08* (2013.01); *G01K 1/16* (2013.01)

(58) Field of Classification Search
CPC ............ G01K 1/08; G01K 1/00; G01K 1/12; G01K 13/02; G01K 1/14; G01K 7/02; G01K 7/04; G01K 7/06; G01K 7/00; G21B 9/06; G01F 23/00; G12B 9/06; H01L 35/02; H01L 35/12; C04B 31/06

USPC ........... 374/44, 121, 139, 142, 179, 208, 163, 374/136; 136/230, 234; 340/870.17; 422/119; 73/340, 341, 359, 295, 73/204.11, 193, 866.5

See application file for complete search history.

(56) References Cited

U.S. PATENT DOCUMENTS

| | | | | |
|---|---|---|---|---|
| 3,085,438 | A | * | 4/1963 | St John et al. ................ 374/121 |
| 3,462,315 | A | * | 8/1969 | Verrando G et al. ........... 136/230 |
| 3,698,954 | A | * | 10/1972 | Jones, Jr. ...................... 136/234 |
| 4,344,315 | A | * | 8/1982 | Moxon et al. ................... 374/44 |
| 4,376,280 | A | * | 3/1983 | Davis et al. .............. 340/870.17 |

(Continued)

FOREIGN PATENT DOCUMENTS

EP 57984 A2 * 8/1982

OTHER PUBLICATIONS

Rana Gunaratnam et al., "Thermocouple Embedding for the Production of a Substrate for Rapid Manufacturing," University of Missouri—Rolla, Reviewed, accepted Aug. 28, 2007, 6 pages; http://utwired.engr.utexas.edu/Iff/symposium/proceedingsArchive/pubs/Manuscripts/2007/2007-04-Gunaratnam.pdf.*

*Primary Examiner* — Gail Kaplan Verbitsky
(74) *Attorney, Agent, or Firm* — Im IP Law PLLC; C. Andrew Im

(57) ABSTRACT

A PTFE jacketed tantalum tipped thermowell that can be used in unusually difficult industrial applications such as pharmaceutical and chemical process plants and semiconductor manufacturing facilities. These facilities have process environments that may include at least one of the following: highly corrosive fluids, difficult mechanical conditions such as rapid or turbulent fluid flows, and/or reasonably high process temperatures and/or pressures.

8 Claims, 11 Drawing Sheets

(56) References Cited

U.S. PATENT DOCUMENTS

| | | | | |
|---|---|---|---|---|
| 4,776,705 A * | 10/1988 | Najjar et al. | | 374/139 |
| 4,822,570 A * | 4/1989 | Lerman et al. | | 422/119 |
| 4,871,263 A * | 10/1989 | Wilson | | 374/139 |
| 5,197,805 A * | 3/1993 | Wilson | | 374/208 |
| 5,427,452 A * | 6/1995 | Stuart | | 374/179 |
| 5,520,461 A * | 5/1996 | Curry et al. | | 374/179 |
| 6,485,175 B1 * | 11/2002 | Nimberger et al. | | 374/142 |
| 7,018,096 B2 * | 3/2006 | Benjamin | | 374/179 |
| 7,165,883 B2 * | 1/2007 | Nimberger et al. | | 374/148 |
| 8,864,375 B2 * | 10/2014 | Abe et al. | | 374/163 |
| 2008/0205484 A1 * | 8/2008 | Toudou et al. | | 374/185 |
| 2008/0205485 A1 * | 8/2008 | Takahashi | | 374/208 |
| 2011/0238281 A1 * | 9/2011 | Sparks et al. | | 701/102 |
| 2013/0223478 A1 * | 8/2013 | Landis et al. | | 374/144 |
| 2014/0109699 A1 * | 4/2014 | Janitch | | 73/866.5 |
| 2014/0269820 A1 * | 9/2014 | Perrault et al. | | 374/54 |

\* cited by examiner

SECTION B-B

METAL FLANGE

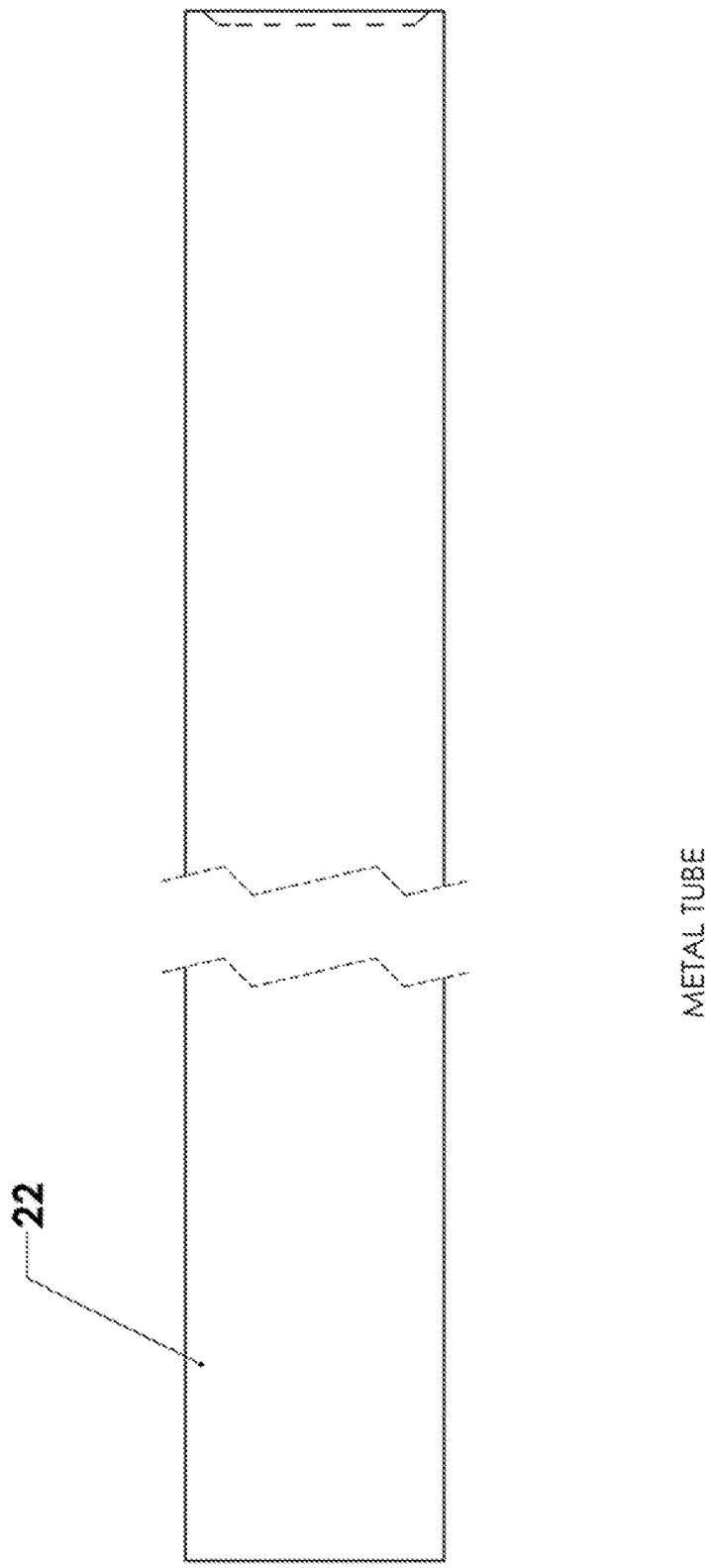

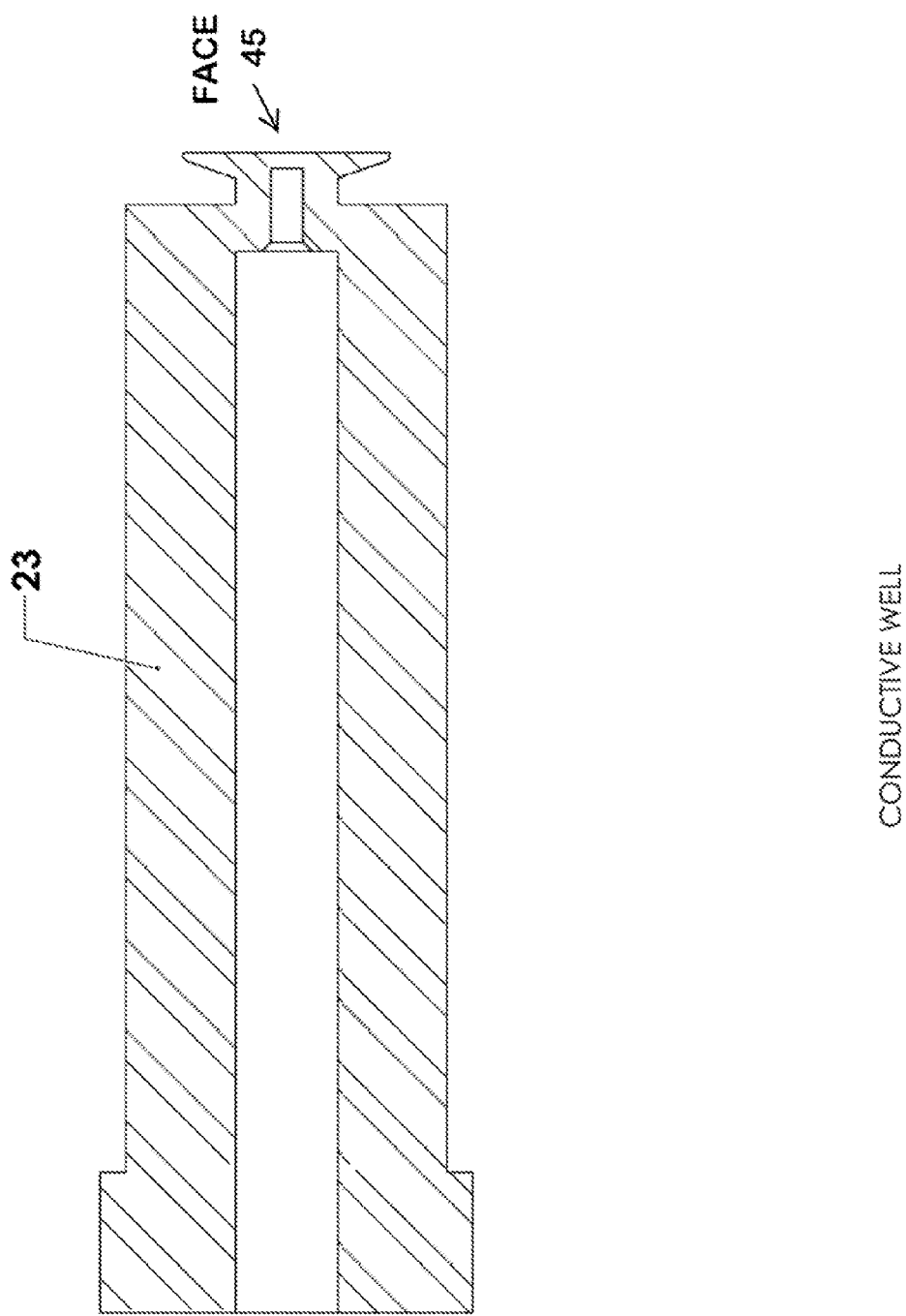

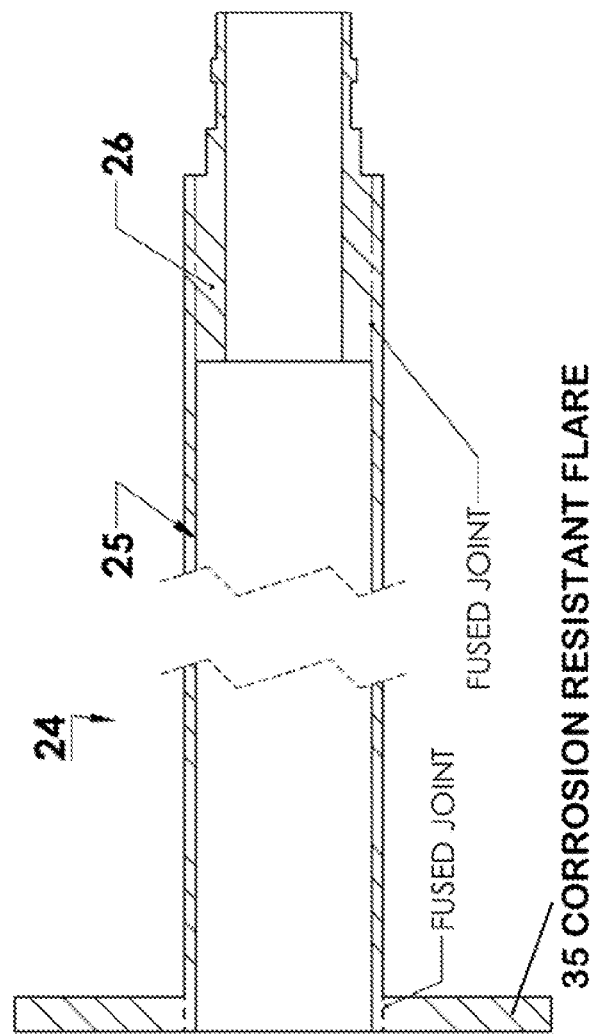

SECTION A-A
HEAT CONDUCTIVE CUP

HALF COUPLING

US 9,091,599 B2

PTFE JACKETED TANTALUM TIPPED THERMOWELL

RELATED APPLICATION

This application claims the benefit of U.S. Provisional Application No. 61/546,796 filed Oct. 13, 2011, which is incorporated herein by reference in its entirety.

FIELD OF THE INVENTION

The claimed invention relates to PTFE (polytetrafluoroethylene) jacketed tantalum thermowells, more particularly to thermowells for use in unusually difficult industrial applications.

BACKGROUND OF THE INVENTION

Thermowells are commonly used in industry to protect sensitive temperature measurement instruments such as thermocouples or thermometers from conditions of process fluids that may cause the bare instrument to suffer damage. The claimed invention relates to a new configuration for the construction of such thermowells for use in unusually difficult industrial applications such as pharmaceutical and chemical process plants, semiconductor manufacturing facilities and other similar facilities with process environments that may include some or all of:

Highly corrosive fluids
Difficult mechanical conditions such as rapid or turbulent fluid flows
Reasonably high process temperatures and/or pressures.

In such industrial applications, maintaining tight control over process temperatures via quick detection and feedback of temperature changes is highly desirable to maintain the most efficient and effective processes. This problem is usually taken care of by employing carbon steel, stainless steel or other common metal thermowells. For highly corrosive environments where common metals do not stand up, the wells may be coated with corrosions resistant materials such as PTFE or made from solid PTFE or similar material.

In certain cases where unusually aggressive instances of the situations described above are encountered, PTFE jackets much thicker than coatings are employed, often with corrosion resistant tantalum cups to improve the sensitivity may be employed.

However all the above solutions have limitations that prevent their use in the most aggressive environments while achieving sensitivities that foster efficient processes. They may:

Have length limitations
Not be strong enough to handle fast moving or agitated fluids or
If fabricated to overcome such limitations, lose sensitivity slowing reaction times to process temperature changes.

These situations provide an opportunity to overcome such limitations by using a combination of some previously employed design elements plus new design elements in a unique combination that allows much improved fluid temperature measurement and control in aggressive fluid environments.

OBJECTS AND SUMMARY OF THE INVENTION

In view of the above-described shortcomings in the art, it is an object of the claimed invention to provide a PTFE jacketed tantalum tipped thermowell that can be used in unusually difficult industrial applications such as pharmaceutical and chemical process plants, semiconductor manufacturing facilities and other similar facilities with process environments that may include some or all of: highly corrosive fluids, difficult mechanical conditions such as rapid or turbulent fluid flows, and/or reasonably high process temperatures and/or pressures.

The importance of well-designed, high quality thermowells used widely in industrial applications cannot be overemphasized. They need to be strong, highly corrosion resistant, and allow for quick response to changes in temperature. Further, there is a need to provide a design with the flexibility to be tuned to avoid vibrations that can be induced by fluid flows.

There have been many instances of thermowell failures, many of which have been attributed to such vibrations induced by fluid flows. One such well-publicized event occurred in 1995, when the failure of a thermowell from vibration at the Monju nuclear power plant in Japan caused leakage of molten sodium coolant resulting in the shutdown of the plant.

It is an object of the claimed invention are to provide a thermowell that protects the most sensitive and responsive thermocouples or thermometers that are usually thin to provide high sensitivity; for example, those as small as $1/16''$ diameter.

It is an object of the claimed invention to provide a thermowell that provides high corrosion resistance by allowing the basic metal well to be encapsulated by a jacket made from material, such as polytetrafluoroethylene (PTFE).

It is an object of the claimed invention to provide a thermowell that enables the basic metal well to be made from commercially available pipes or tubes. Such pipe or tube enable a wide choice in preparing a design that is flexible enough to incorporate as needed, large diameters, heavy wall thicknesses, high strength metals and/or corrosion resistant metals where users require that for any non-encapsulated, exposed thermowell elements.

It is an object of the claimed invention to provide a thermowell that provides enhanced conductivity and thus responsiveness by employing a cup, at the point which temperature needs to be measured, made from corrosion resistant metal conductive material (such as tantalum) while controlling costs by utilizing a small diameter and thin wall design.

It is an object of the claimed invention to provide the thermowell as aforesaid that further enhances conductivity and responsiveness while controlling costs by utilizing a stepdown diameter for the tip which minimizes the wall thickness.

It is an object of the claimed invention to provide a thermowell that enables the use of commercially available thermocouples and thermometers that feature thin diameters and spring loading. The former enables greater instrument sensitivity and the latter ensures close contact of the tip to the metal housing at the bottom.

It is an object of the claimed invention to provide the thermowell as aforesaid that allows for comparatively easy and accurate insertion of thin diameter thermocouples and thermometers by creating a centering insertion guide using a highly conductive material such as copper at the tip. The copper guide also acts as a reinforcement for the thin wall cup to permit use of the wells at higher pressures.

It is an object of the claimed invention to provide the thermowell as aforesaid whose design permits the manufacture of varying lengths—short ones to be used in piping systems, often inserted into elbows or tees, and long ones to reach far into large process vessels and normally installed in vessel nozzles It is an object of the claimed invention to provide the thermowell as aforesaid that can be tuned to avoid vibrations induced by fluid flows by utilizing a highly flexible arrangement of design elements.

It is an object of the claimed invention to provide the thermowell as aforesaid that can be specified with flanged connections to ensure strong connections to industry standard piping and vessel systems.

It is an object of the claimed invention to provide the thermowell as aforesaid that further ensures quick response to fluid temperature changes by incorporating a conductive paste at the critical contact surface.

BRIEF DESCRIPTION OF THE DRAWINGS

FIG. 4 is a cross-sectional schematic view of the outer tubular section or shell of the PTFE jacketed tantalum tipped thermowell in accordance with an exemplary embodiment of the claimed invention;

FIG. 5 is a cross-sectional schematic view of the conductive well of the PTFE jacketed tantalum tipped thermowell in accordance with an exemplary embodiment of the claimed invention;

FIG. 6 is a cross-sectional schematic view of a section or sub-assembly of the PTFE jacket in accordance with an exemplary embodiment of the claimed invention;

While in the illustrated embodiments features of the invention have been put forward, it is to be understood that the invention is not limited to the precise form illustrated, and the changes may be made thereto without departing from the spirit or substance of the invention.

DETAILED DESCRIPTION OF THE EMBODIMENTS

Figure 1:
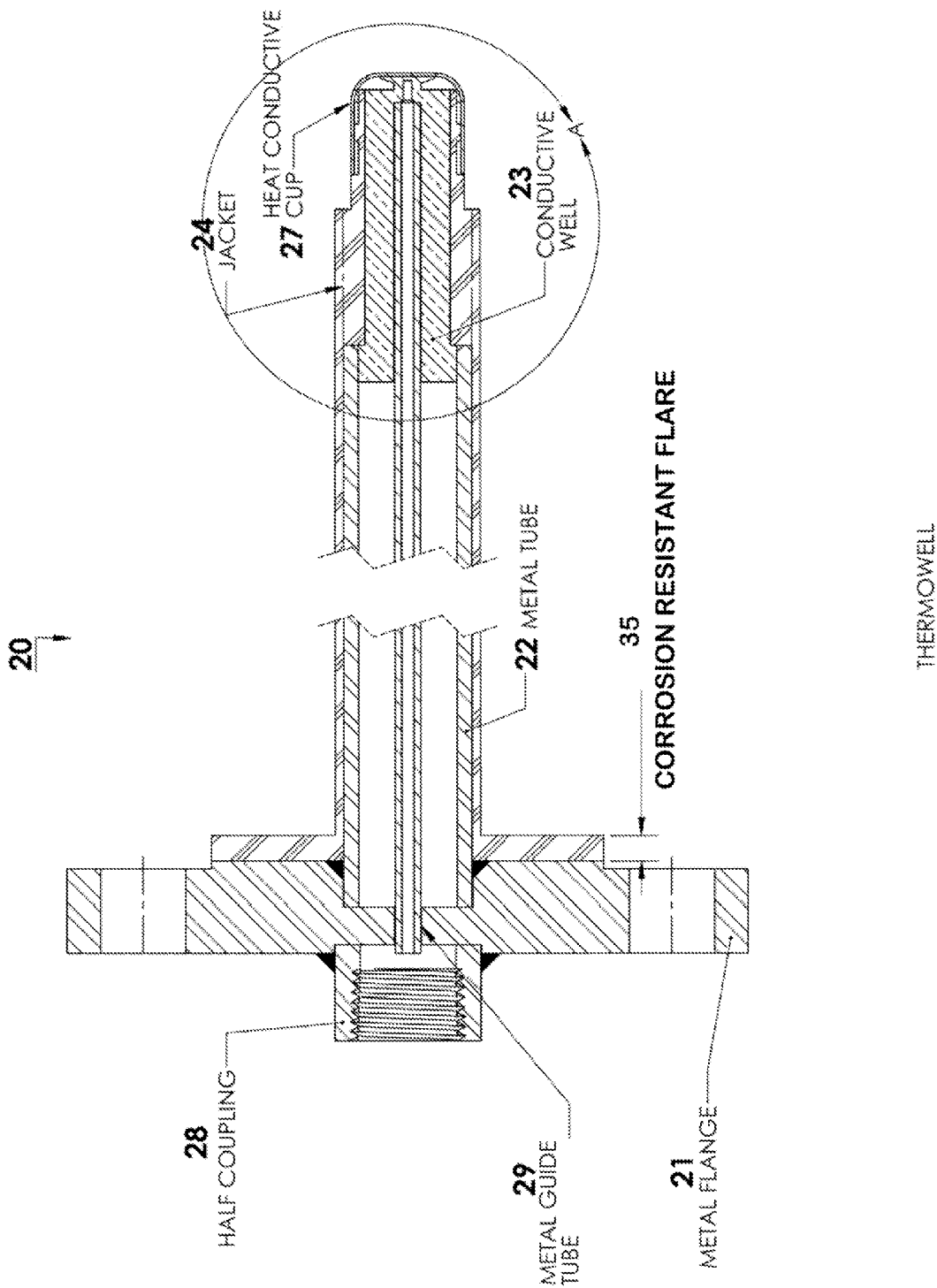
FIG. 1 is a cross-sectional schematic view of a PTFE jacketed tantalum tipped thermowell in accordance with an exemplary embodiment of the claimed invention.

Referring to the drawings in detail, FIG. 1 shows the thermowell 20 in accordance with an exemplary embodiment of the claimed invention, thermowells are commonly used in process containment devices such as process vessels or pipes to protect sensitive temperature measuring devices such as thermocouples or thermometers from damage due to rapid fluid flows and/or aggressively corrosive environments. The claimed thermowell provides extreme corrosion resistance at temperatures up to the maximum allowable temperatures for the polytetrafluorethylene (PTFE) material, i.e., 288° C. (550° F.).

As shown in FIG. 1, the claimed thermowell device 20 has a shell comprising components or parts 21, 22 and 23, that can be made from readily available metals. The shell provides the basic structure and strength of the thermowell 20. The particular design features of the claimed thermowell 20 allow for the use of an unusually wide range of lengths and diameters. Long lengths (up to 4 meters or more) are often needed to provide quick response to changes in fluid temperature at a remote point, one that can be reached by insertion of long length thermowell 20 into a flanged opening in a process vessel or pipe. Large diameters (up to 100 mm or more) are often needed to provide extra strength to such long length thermowells 20 to resist rapid and/or turbulent fluid flows.

Figure 2:
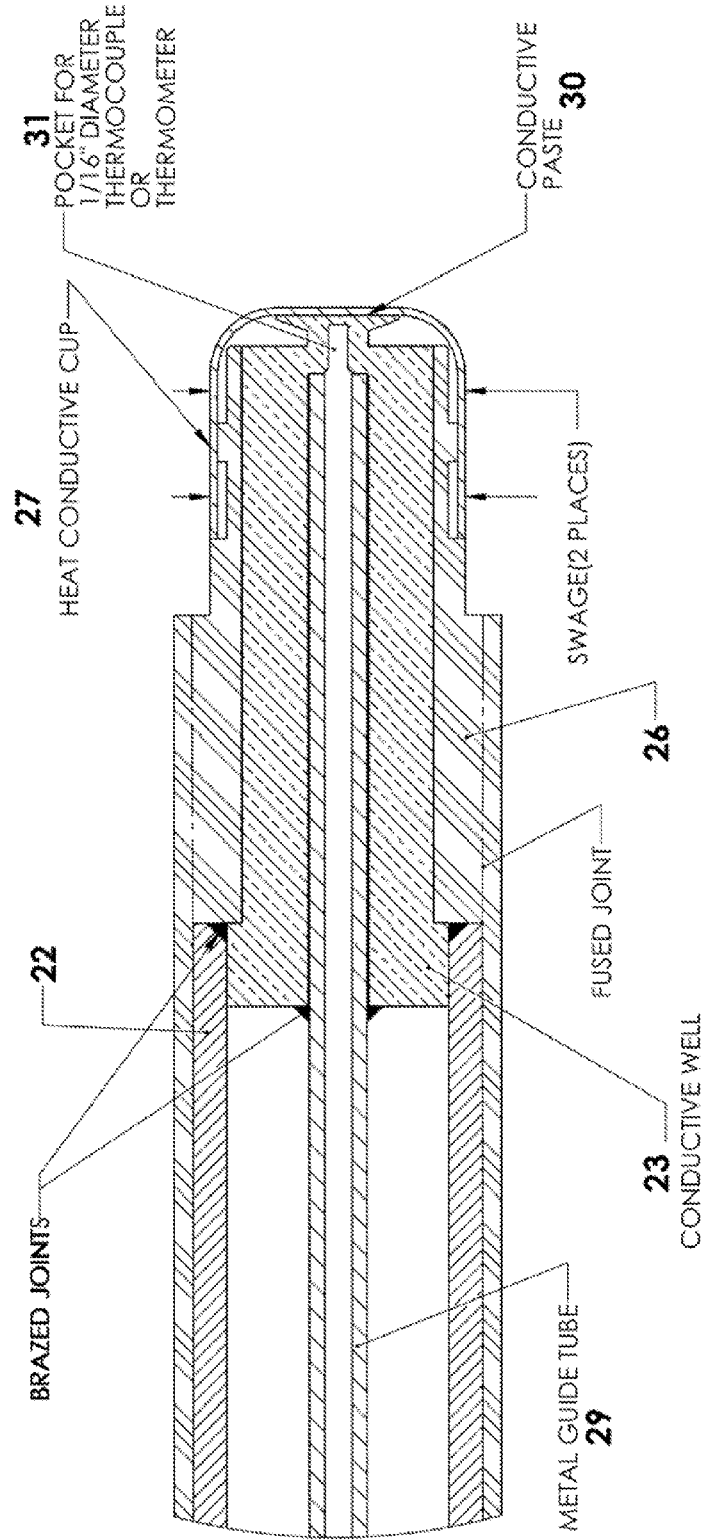
FIG. 2 is a detailed cross-sectional schematic view of an area labeled "A" of the PTFE jacketed tantalum tipped thermowell in FIG. 1.

The common metals used for these components 21, 22 and 23 can be, but not limited to, carbon steel, stainless steel, or other alloys such as Monel®. Monel® is a registered trademark of Huntington Alloys Corporation. As shown in FIGS. 1 and 5, in accordance with an exemplary embodiment of the claimed invention, a highly conductive material such as copper can be used at the tip to provide the conductive or copper well 23 with superior sensitivity to changes in temperature at the remote point where the measuring tip of the thermocouple or thermometer is located. As shown in FIG. 1, in accordance with an exemplary embodiment of the claimed invention, the tubular section or shell 22 is welded or brazed to the flange 21. As shown in FIG. 2, in accordance with an exemplary embodiment of the claimed invention, the conductive or copper well 23 is brazed to the tubular section 22.

Figure 3A:
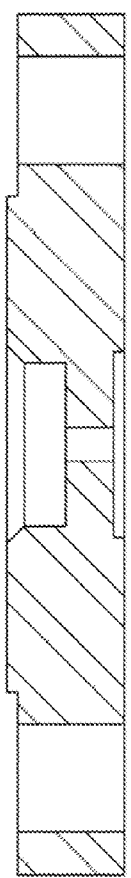
FIGS. 3A-3B show various schematic views of the flange of the PTFE jacketed tantalum tipped thermowell in accordance with an exemplary embodiment of the claimed invention.
Figure 3B:
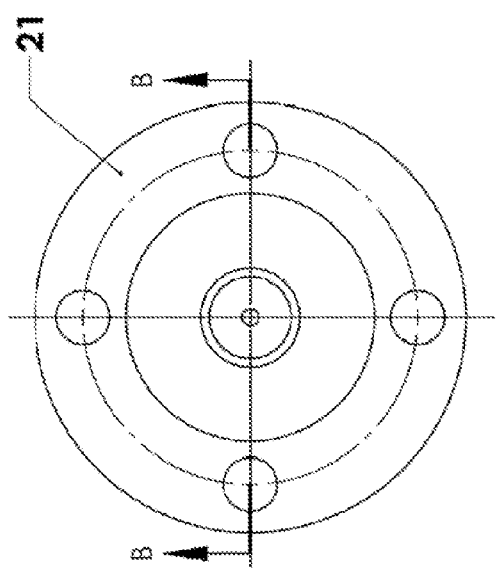
Figure 7:
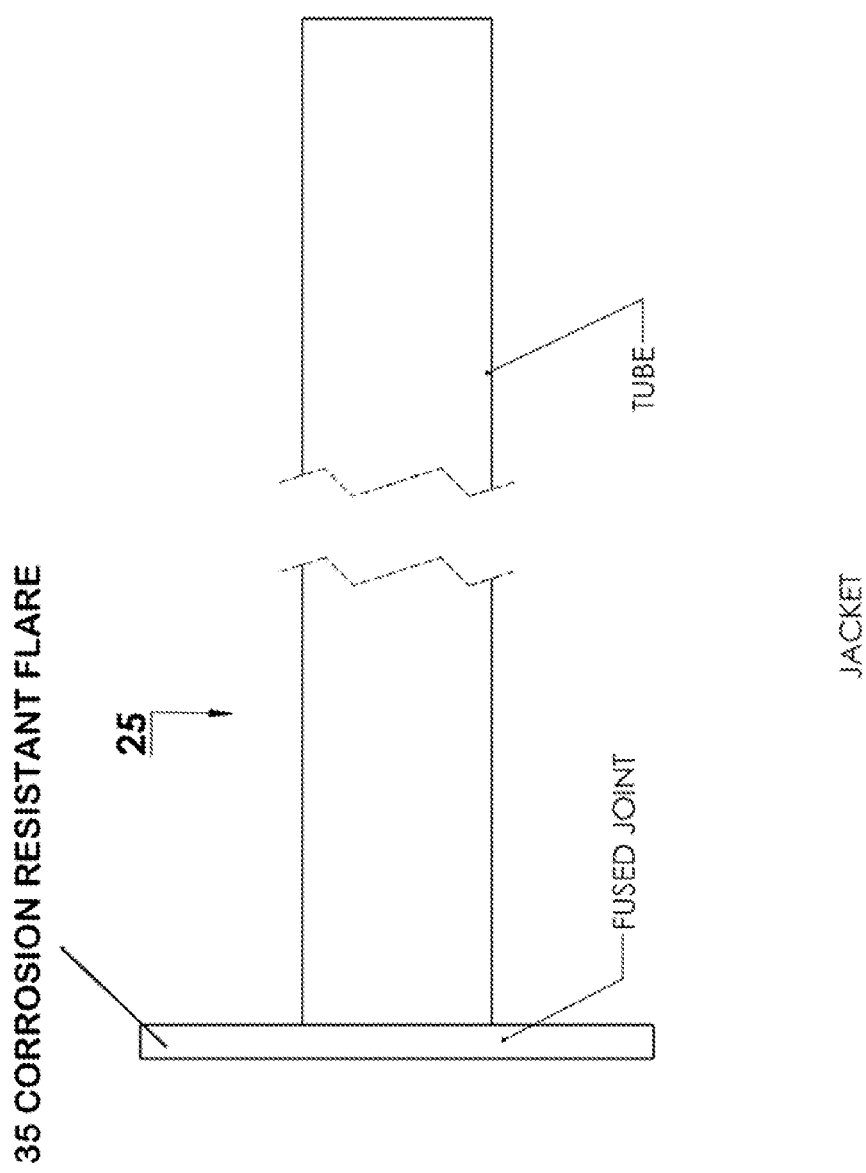
FIG. 7 is a cross-sectional schematic view of a section or sub-assembly of the PTFE jacket in accordance with an exemplary embodiment of the claimed invention.
Figure 8:
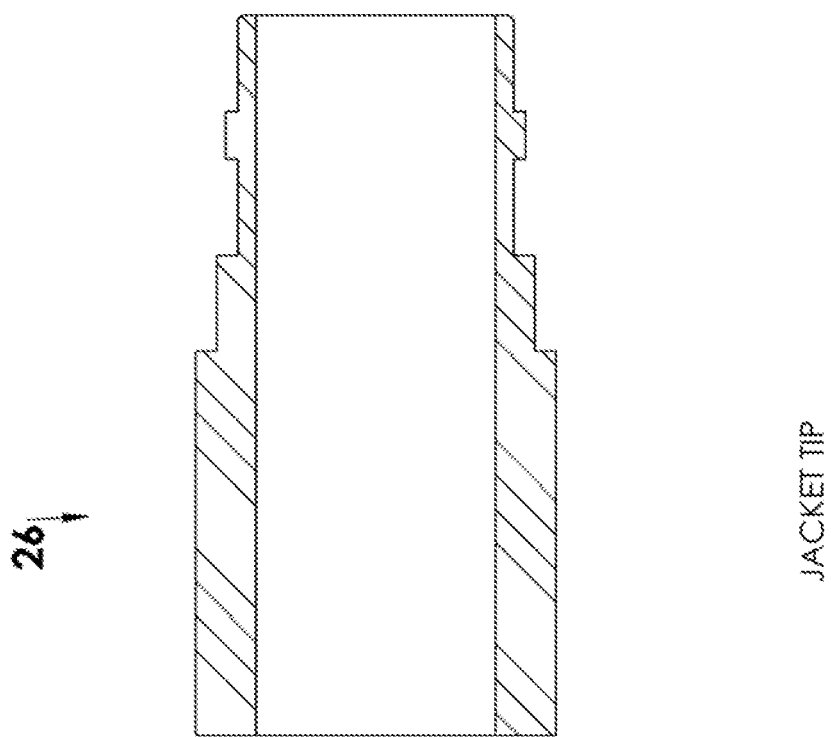
FIG. 8 is a cross-sectional schematic view of a tip of the PTFE jacketed tantalum tipped thermowell in accordance with an exemplary embodiment of the claimed invention.

As shown in FIG. 1, to enhance the protection against corrosive environments, in accordance with an exemplary embodiment of the claimed invention, the metal components/parts 21, 22, 23 that would normally come into contact with the fluid requiring temperature measurement are covered with highly corrosion resistant materials. In accordance with an exemplary embodiment of the claimed invention, a jacket 24 made of PTFE (or PTFE jacket 24) covers the face of the flange 21 of FIGS. 3A-B, the outer tubular section 22, and most of the conductive or copper well 23. It is appreciated that other plastics can be used to achieve alternate properties. As shown in FIGS. 6, 7 and 8, in accordance with exemplary embodiment of the claimed invention, the PTFE jacket 24 comprises two components or parts 25, 26. Preferably, these two components 25, 26 are fused or welded together to form the PTFE jacket 24.

Figure 9:
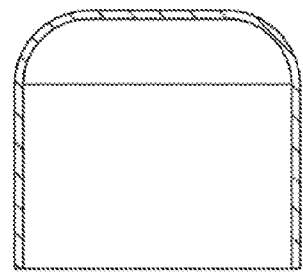
FIG. 9 are various views of the tantalum cup of the PTFE jacketed tantalum tipped thermowell in accordance with an exemplary embodiment of the claimed invention.

Turning now to FIGS. 1 and 9, because PTFE is not a good conductor, in accordance with an exemplary embodiment of the claimed invention, the bottom most portion of the conductive or copper well 23 is covered with a highly corrosion resistant tantalum cup 27. As shown in FIG. 2, in accordance with an exemplary embodiment of the claimed invention, the tantalum cup 27 is swaged over the PTFE jacket 24 to provide a leak tight seal between its inner surface and the outer surface of component/part 26. In addition to its excellent corrosion resistance, tantalum is an excellent conductor of heat thus providing the potential for a quick response to changes in fluid temperature.

In accordance with an exemplary embodiment of the claimed invention, FIG. 9 shows a small size thin walled tantalum cup 27 that is used for all lengths and diameters of these thermowells 20. The small diameter of the tantalum cup 27 allows for use of a thin cup with advantages described herein. First, when the tantalum cup 27 is supported by the base machined at the tip of the conductive or copper well 23, the assembly can be used at higher fluid pressures than if just a thin unsupported cup is used. Second, because the tantalum cup 27 is smaller in diameter than the outer tubular shell 22, it will permit higher pressures than the larger diameter cups typically used. Third, the use of the small thin walled tantalum cup 27 in the claimed invention reduces the cost of the device because tantalum is a high cost material.

Figure 10:
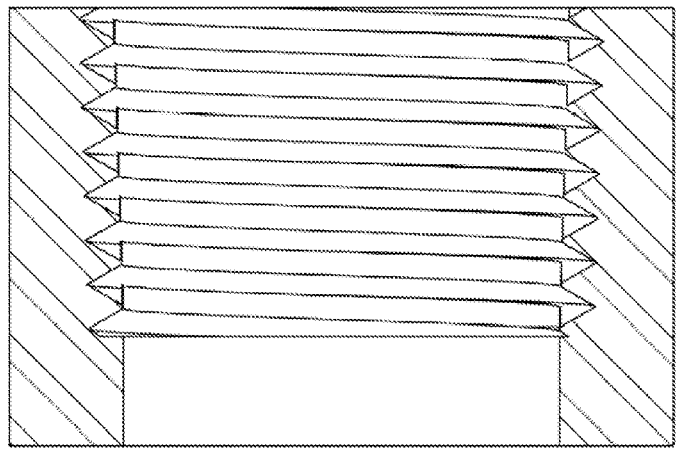
FIG. 10 is a cross-sectional view of a threaded half coupling component/part of the PTFE jacketed tantalum tipped thermowell in accordance with an exemplary embodiment of the claimed invention.
Figure 11:
FIG. 11 is a cross-sectional view of a guide tube of the PTFE jacketed tantalum tipped thermowell in accordance with an exemplary embodiment of the claimed invention.

Turning now to FIGS. 1, 10 and 11, in accordance with an exemplary embodiment of the claimed invention, the two remaining metal components or parts: the threaded half coupling component/part 28 is welded to the flange 21, and the guide tube 29, advantageously allows standard, commercially available thin temperature measuring devices (not shown) to be inserted into the conductive or copper well 23, reach the bottom of the conductive or copper well 23, and make contact with the tantalum cup 27 without bending or kinking. As shown in FIG. 2, in accordance with an exemplary embodiment of the claimed invention, to keep the guide tube 29 in place it is brazed to the conductive or copper well 23.

As shown in FIGS. 2 and 5, to improve the response time to fluid temperature changes, in accordance with an exemplary embodiment of the claimed invention, the tip of the copper well 23 has a specially machined thin base with a hole 31 machined to fit the $\frac{1}{16}$" tip of the temperature measuring device (not shown). The design of the claimed invention advantageously allows for such small diameter thermocouples, even in long length thermowells 20. It is noted that the small diameter thermocouples improve response times. Also, as shown in FIG. 2, in accordance with an exemplary embodiment of the claimed invention, the face at the base of the conductive or copper well 23 is also installed using a thin layer of conductive paste 30 to further improve the response time.

Various omissions, modifications, substitutions and changes in the forms and details of the device illustrated and in its operation can be made by those skilled in the art without departing in any way from the spirit of the present invention. Accordingly, the scope of the invention is not limited to the foregoing specification, but instead is given by the appended claims along with their full range of equivalents.

The invention claimed is:

1. A device for providing isolation between a temperature sensor and a fluid to be measured, comprising:
a metal guide tube for receiving the temperature sensor, the metal guide tube having a top end and a bottom end;
a conductive well having a top end and a bottom end having a base, the top end having an outer diameter greater than an outer diameter at the bottom end, the conductive well surrounds the bottom end of the metal guide tube, the conductive well being brazed to the metal guide tube;
a metal tube surrounding the top end of the conductive well and a remaining portion of the metal guide tube, the conductive well being brazed to the metal tube;
a corrosion resistant jacket subassembly having at least two outer diameters excluding a corrosion resistant flare and encapsulating the metal tube and a remaining portion of the conductive well not surrounded by the metal tube;
a thin walled, corrosion resistant and heat conductive cup having an outer diameter smaller than a larger of the two outer diameters of the corrosion resistant jacket subassembly, the corrosion resistant and heat conductive cup being located at a base of the conductive well and entirely covering a bottom end of the corrosion resistant jacket subassembly;
a metal flange securing a top end of the device and surrounding the metal guide tube at the top end opposite the corrosion resistant and heat conductive cup;
a metal half coupling connected to the metal flange;
wherein the corrosion resistant flare at the end of the corrosion resistant jacket seals to a bottom face of the metal flange, the corrosion resistant flare has an outside diameter covering part or all of the bottom face of the flange and an inside diameter substantially equal to the larger of two outer diameters of the corrosion resistant jacket subassembly; and
wherein the base of the conductive well comprises an opening to receive a tip of the temperature sensor.

2. The device of claim 1, wherein the conductive well is a copper conductive well.

3. The device of claim 1, wherein the corrosion resistant and heat conductive cup is a tantalum cup covering the base of the conductive well to provide a quick response to temperature changes.

4. The device of claim 1, wherein the metal tube is made from one of the following: carbon steel, stainless steel or alloy.

5. The device of claim 1, wherein the corrosion resistant jacket subassembly is a polytetrafluoroethylene (PTFE) jacket.

6. The device of claim 1, wherein the corrosion resistant and heat conductive cup is swaged over the corrosion resistant jacket subassembly to provide a leak tight seal.

7. The device of claim 1, wherein the corrosion resistant jacket subassembly comprises two components that are fused or welded together.

8. The device of claim 1, wherein a face at the base of the conductive well is installed using a thin layer of conductive paste to further improve response time.

* * * * *